March 21, 1933.  L. W. REIS  1,902,581

SUSPENSION RING FOR SCALE PANS

Filed Sept. 14, 1931  2 Sheets-Sheet 1

INVENTOR
LEONARD W. REIS
BY
ATTORNEY

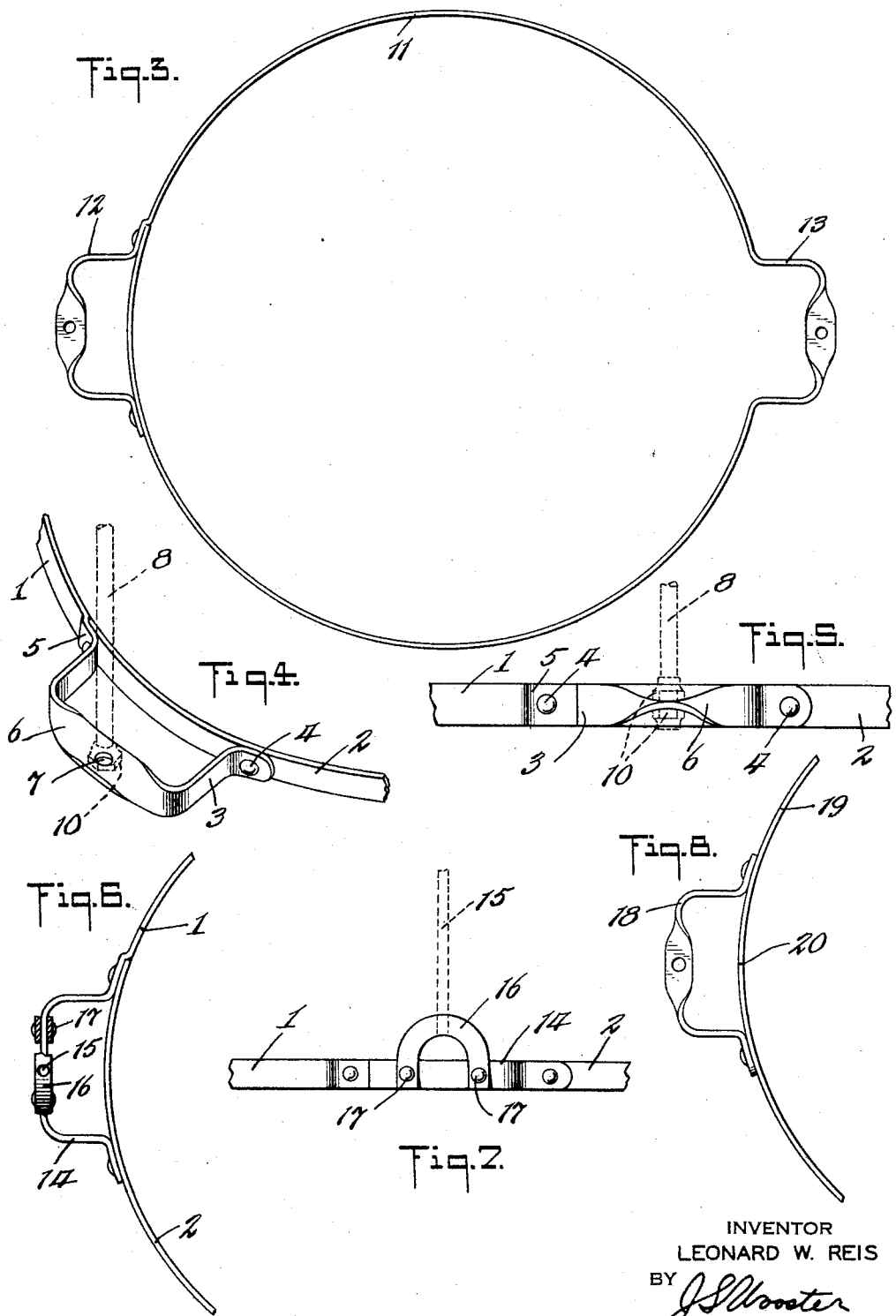

Patented Mar. 21, 1933

1,902,581

UNITED STATES PATENT OFFICE

LEONARD W. REIS, OF DUMONT, NEW JERSEY, ASSIGNOR TO JOHN CHATILLON & SONS, OF NEW YORK, N. Y., A CORPORATION OF NEW YORK

SUSPENSION RING FOR SCALE PANS

Application filed September 14, 1931. Serial No. 562,711.

This invention relates to suspension scales and has for its object to simplify the construction of the frames or rings which are used to support the weighing pans in scales of this type.

Other objects of the invention are to provide a light, rigid suspension ring capable of withstanding severe strains; to construct such a ring in one piece or in two similar pieces which are easily formed and assembled; to reinforce the ring at the points of attachment to the suspension bails; and to provide an improved fork for attaching the ring to the suspension bails.

Suspension rings of the type referred to are usually made by bending a strip of metal into a circle and securing the ends together like an ordinary hoop. Two forks are usually secured to the ring, at opposite points on the periphery, to receive the vertical rods or bails on which the ring is suspended. These rings are always subject to breakage at their weakest points, that is, at the point where the ends of the ring are connected together and at the points where the forks are connected to the ring. Furthermore, the forks have to be specially shaped and thickened to reinforce them at the legs which are riveted to the ring and at the intermediate portions which are drilled to receive the suspension bails.

An important feature of my invention resides in simplifying the construction and assembly of these suspension rings, while greatly increasing their strength and rigidity, by making the entire ring, including the forks, from one piece of material, or by using two similarly shaped pieces of material which may be fitted together in complementary fashion to complete the ring.

In the preferred form of the invention the ring is made of two similar strips of metal or other material which are semi-circular in shape and have one end bent or looped outwardly to provide an integral fork. When the two halves of the ring are brought together to form a complete circle the forked end of one overlaps the plain end of the other, and these overlapping parts are preferably secured together at both sides of the forks to strengthen the joints.

In making a ring from one continous strip of material, I form a projecting loop adjacent one end of the strip as before. I also form a similar loop at an intermediate portion of the strip in such position that when the strip is bent into the form of a circle, with the forked end overlapping the plain end, the two forks will be opposite each other on the periphery of the ring.

In all forms of the invention I prefer to use a strip or strips of flat metal so proportioned that the peripheral surface will be broader than the thickness of the ring, giving great strength in the direction of the ring's axis. In shaping the forks the central portions lying between the legs are twisted or curled over into a plane perpendicular to the axis of the ring, thus providing broad flat surfaces for attachment to the suspension bails and also strengthening the forks against bending strains. One or both of the twisted forks may be made separately from the ring and secured thereto by riveting or otherwise, but in all cases they may be made from the same strip material as the ring.

These and other features of the invention will be described in connection with the accompanying drawings, in which:

Fig. 3 is a plan view of a ring made in one piece;

Fig. 4 is a fragmentary perspective view of the ring shown in Fig. 1;

Fig. 5 is a side view of the fork shown in Figs. 1 and 4;

Fig. 6 is a fragmentary plan view of a similar ring having a plain fork and means for connecting it to the suspension bail;

Fig. 7 is a side view of the fork shown in Fig. 6;

Fig. 8 is a plan view of a modified construction in which the fork is made separately from the ring.

Figure 1:
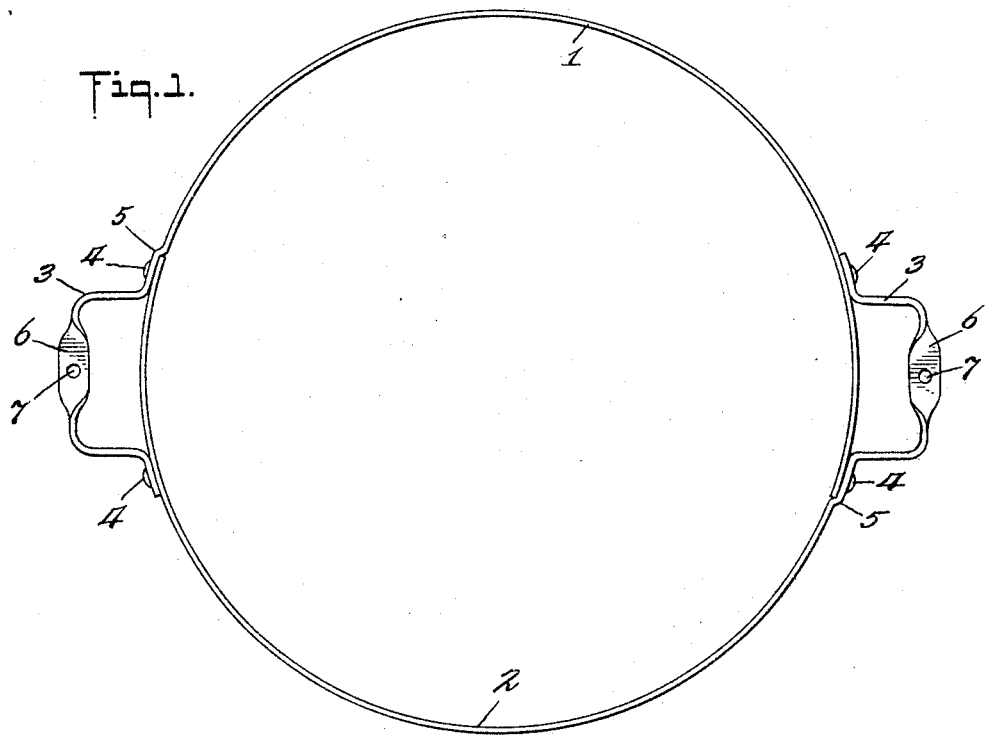
Fig. 1 is a plan view of a suspension ring made in two pieces with integral forks.

The suspension ring shown in Fig. 1 is made of two similar strips or bands 1 and 2, of flat metal or other suitable material, which are substantially semi-circular in shape, each having one plain end and an opposite end which is bent outwardly to provide a substantially U-shaped loop or integral fork 3. When the two arcuate segments 1 and 2 are brought together in complementary fashion to form a complete circle, the forked end of each segment overlaps the plain end of the other segment as shown in Figs. 1 and 4. The two segments are secured together in this position as by means of rivets 4 at both sides of the forks 3. If desired, the periphery of each segment may be bent out slightly at 5, adjacent the closed leg of each fork, to provide a seat for the free end of the other segment and thus preserve the circular continuity of the inner surface of the ring.

Figures 2, 9:
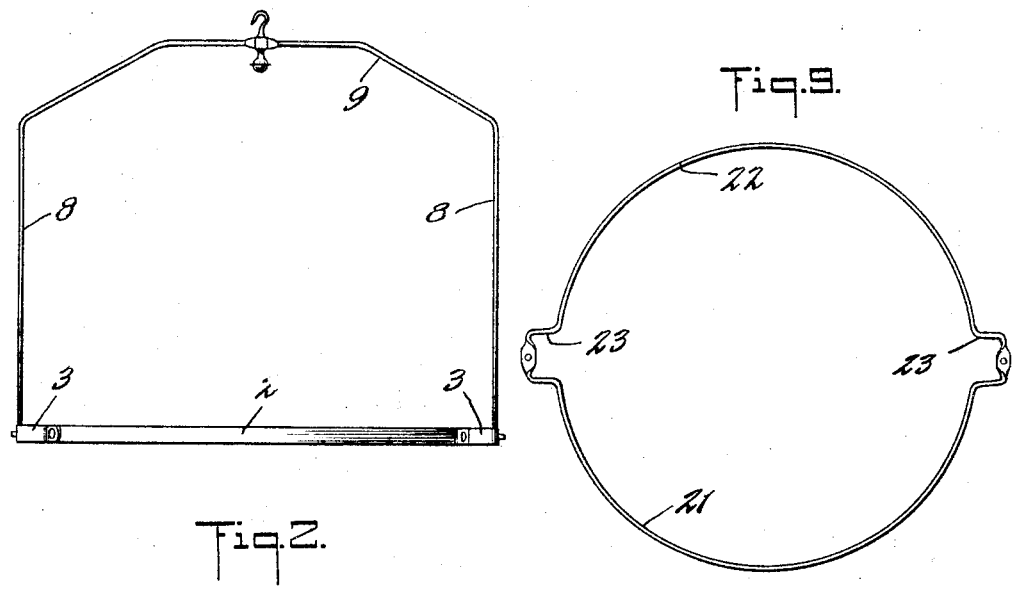
Fig. 2 is a side elevation showing the ring attached to a scale hanger.
Fig. 9 is a plan view of a plain ring made in one piece with opposite portions bent and twisted to form the forks.

The arcuate segments 1 and 2 are preferably made from flat strips or bands of metal so proportioned that the peripheral surface of the ring is substantially broader than the thickness of the ring, as shown in Fig. 4, enabling the ring to withstand severe strains in the direction of its axis. In order to facilitate attachment to the suspension bails of the scale, the central portions of the metal intermediate the legs of the U-shaped forks 3 are twisted or curled over at 6 into a plane substantially perpendicular to the legs of the forks and to the axis of the ring, as shown in Figs. 1, 4 and 5. These flat portions 6 of the forks are provided with holes 7 to receive the suspension bails 8 of the scale hanger 9 as shown in Fig. 2. The lower ends of the bails 8 may be threaded to receive the nuts 10 for clamping the bails to the forks as shown in Figs. 4 and 5.

It will be seen from the above that the arcuate segments 1 and 2 are exactly alike, and can be made in a single forming operation. When fitted together in complementary fashion, with the forked end of one overlapping the plain end of the other, the rings may be completed by a simple riveting or welding operation. By forming the forks 3 integral with the segments 1 and 2, and twisting or curling the central portions of the forks over to receive the suspension bails, I simplify the attachment of the suspension bails to the wide flat portions of the forks, strengthen the forks against bending strains, and strengthen the ring at the points where the two arcuate segments are connected together.

The ring shown in Fig. 3 is somewhat similar to that shown in Fig. 1, except that it is made of a single flat strip of material 11. In this case the material adjacent one end of the strip 11 is bent outwardly to form a U-shaped fork 12 in the manner described above, a portion of the material intermediate the ends of the strip is bent outwardly to form a second integral U-shaped fork 13. The fork 13 is so positioned that when the strip 11 is bent to circular shape, with the forked end 12 overlapping the plain end of the strip, the forks 12 and 13 will be at opposite points on the periphery. The metal lying between the legs of the forks 12 and 13 is twisted or curled over, to provide flat surfaces lying in a plane perpendicular to the axis of the ring as previously described.

Figs. 6 and 7 show a ring similar to that shown in Fig. 1, except that it has a plain or untwisted fork 14. This ring is supported by means of suspension bails 15 each having a bifurcated end member 16 which straddles the central portion of the fork 14 and is secured thereto in any suitable manner as by rivets 17.

In Fig. 8, the fork 18 is exactly the same as that shown in Figs. 1 to 5 except that it is made in a separate piece and has both legs riveted or otherwise secured to a ring 19. The ring 19 may be made of a single strip of material having its ends soldered or welded together at 20, in which case the fork 18 at the opposite side of the ring will also be constructed and attached in the manner shown in Fig. 8. If desired, however, the ring may be constructed of a strip of flat metal having one integral fork, similar to the fork 12 in Fig. 3, while the opposite fork may be constructed separately and attached to the ring in the manner shown in Fig. 8.

Fig. 9 shows a suspension ring made from a single strip of flat metal 21 with its ends soldered or welded together at 22. The forks 23, at opposite points on the periphery, are similar to the fork 13 in Fig. 3, being formed by bending the metal outwardly and twisting the central portion over into a plane perpendicular to the axis of the ring.

It will be evident that numerous changes may be made in the details of construction herein shown and described without departing from the scope and spirit of the invention as defined in the appended claims.

The invention claimed is:

1. A suspension ring for scale pans comprising a strip of material having a plain end and an integral loop projecting outwardly adjacent the other end, the looped end of the strip overlapping the plain end and secured thereto at both sides of the loop.

2. A suspension ring for scale pans comprising a strip of material having a plain end and an integral loop projecting outwardly adjacent the other end, the looped end of the strip overlapping the plain end and secured thereto at both sides of the loop, and a portion of the strip adjacent said loop being bent out sufficiently to receive the plain end of the strip and preserve the circular continuity of the inner surface of the ring.

3. A suspension ring for scale pans comprising a strip of material having a peripheral surface broader than its thickness, said strip having a plain end and an integral loop projecting outwardly adjacent the other end, the looped end of the strip overlapping the plain end and secured thereto at both sides of the loop, and the loop having a portion of its surface twisted into a plane perpendicular to the axis of the ring.

4. A suspension ring for scale pans, comprising two arcuate strips of material each having one plain end and a loop projecting outwardly adjacent the other end, the looped end of each strip overlapping the plain end of the other strip, and means for securing the overlapping ends of said strips together.

5. A suspension ring for scale pans, comprising two arcuate strips of material each having one plain end and a loop projecting outwardly adjacent the other end, the looped end of each strip overlapping the plain end of the other strip and being secured thereto at both sides of the loop.

6. A suspension ring for scale pans, comprising two arcuate segments having a peripheral surface broader than their thickness, an integral fork projecting beyond the periphery at one end of each segment and overlapping the adjacent plain end of the other segment, and means for securing the overlapping ends of said segments together.

7. A suspension ring for scale pans, comprising two arcuate segments having a peripheral surface broader than their thickness, an integral fork projecting beyond the periphery at one end of each segment and overlapping the adjacent plain end of the other segment, and rivets securing the overlapping ends of said segments together at both sides of said forks.

8. A suspension ring for scale pans, having a peripheral surface broader than the thickness of the ring and having portions of said surface twisted into a plane perpendicular to the axis of the ring.

9. A suspension ring for scale pans, having a peripheral surface broader than the thickness of the ring and having portions of said surface looped outwardly and twisted into a plane perpendicular to the axis of the ring.

10. A suspension ring for scale pans having a peripheral surface broader than the thickness of the ring and having at least two adjacent overlapping ends, a loop adjacent one of the ends projecting beyond the surface of the ring and having its central portion twisted into a plane perpendicular to the axis of the ring, and means for securing the overlapping ends of the ring together.

11. A suspension ring for scale pans, comprising two arcuate segments having a peripheral surface broader than their thickness, an integral fork projecting beyond the periphery at one end of each segment with its central portion twisted into a plane perpendicular to the axis of the ring, the forked end of each segment overlapping the other end of the other segment and being secured thereto at both sides of said forks.

12. The combination with a suspension ring for scale pans, of a bent fork having flat legs for connection to the periphery of the ring and a central portion twisted at an angle to the legs for attachment to a hanger.

Signed at New York, in the county of New York and State of New York this 11th day of September A. D. 1931.

LEONARD W. REIS.